US 11,156,830 B2

(12) United States Patent
Johnson et al.

(10) Patent No.: US 11,156,830 B2
(45) Date of Patent: Oct. 26, 2021

(54) CO-LOCATED POSE ESTIMATION IN A SHARED ARTIFICIAL REALITY ENVIRONMENT

(71) Applicant: Facebook Technologies, LLC, Menlo Park, CA (US)

(72) Inventors: Samuel Alan Johnson, Redwood City, CA (US); Carsten Sebastian Stoll, San Francisco, CA (US); Benjamin Antoine Georges Lefaudeux, Menlo Park, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 48 days.

(21) Appl. No.: 16/683,950

(22) Filed: Nov. 14, 2019

(65) Prior Publication Data
US 2021/0149190 A1 May 20, 2021

(51) Int. Cl.
*G02B 27/00* (2006.01)
*H04N 13/344* (2018.01)
(Continued)

(52) U.S. Cl.
CPC .......... *G02B 27/0093* (2013.01); *G06F 3/011* (2013.01); *G06T 19/006* (2013.01); *H04L 67/38* (2013.01); *H04N 13/344* (2018.05)

(58) Field of Classification Search
CPC ....... G06T 15/205; G06T 7/70; G06T 19/006; A63F 13/843; A63F 13/56; A63F 13/25;
(Continued)

(56) References Cited

U.S. PATENT DOCUMENTS 9,898,864 B2 * 2/2018 Shapira .................. G06F 3/017
10,445,925 B2 * 10/2019 Tokubo .................. A63F 13/56
(Continued)

FOREIGN PATENT DOCUMENTS

WO 2016191051 A1 12/2016

OTHER PUBLICATIONS

International Search Report and Written Opinion of International Application No. PCT/US2020/055712, dated Jan. 26, 2021, 11 pages.
(Continued)

*Primary Examiner* — Rodney Amadiz
(74) *Attorney, Agent, or Firm* — Shumaker & Sieffert, P.A.

(57) ABSTRACT

Artificial reality (AR) systems track pose and skeletal positioning for multiple co-located participants, each having a head mounted display (HMD). Participants can join a shared artificial reality event or experience with others in the same location. Each participant's HMD can independently render AR content for the participant based on the participant's pose and pose information obtained from other participants' HMDs. A participating HMD may broadcast tracking estimates for skeletal points of interest (e.g., joints, finger tips, knees, ankle points, etc.) that are within the field-of-view of the HMD's cameras and/or sensors. A participating HMD may receive skeletal position information determined by other HMDs, and aggregate the received tracking information along with internal tracking information to construct an accurate, full estimate of its own pose and skeletal positioning information for its corresponding participant.

17 Claims, 10 Drawing Sheets

(51) Int. Cl.
*G06F 3/01* (2006.01)
*G06T 19/00* (2011.01)
*H04L 29/06* (2006.01)

(58) Field of Classification Search
CPC .... A63F 13/48; A63F 13/5255; A63F 13/795; A63F 13/847; A63F 2300/8082; G02B 27/017; G02B 27/0172; G02B 27/0093; G06F 1/163; G06F 3/011; G06F 3/012; G06F 3/013; G06F 3/0304; G06F 3/04815; H04L 67/38; H04N 13/344
See application file for complete search history.

(56) References Cited

U.S. PATENT DOCUMENTS

| | | | | |
|---|---|---|---|---|
| 2013/0114851 | A1* | 5/2013 | Foote | G06T 7/77 382/103 |
| 2015/0243079 | A1* | 8/2015 | Oho | G02B 27/017 345/633 |
| 2016/0093108 | A1* | 3/2016 | Mao | A63F 13/825 345/633 |
| 2016/0350973 | A1* | 12/2016 | Shapira | G06F 3/017 |
| 2018/0005429 | A1* | 1/2018 | Osman | G06T 15/20 |
| 2018/0322681 | A1* | 11/2018 | Inomata | A63F 13/211 |
| 2019/0279428 | A1* | 9/2019 | Mack | A63F 13/211 |
| 2019/0318194 | A1* | 10/2019 | Liu | G06T 7/12 |
| 2020/0035020 | A1* | 1/2020 | Price | G06T 15/04 |
| 2020/0380784 | A1* | 12/2020 | Iyer | G06F 3/012 |

OTHER PUBLICATIONS

Newman et al., "Ubiquitous Tracking for Augmented Reality," In Proceedings of Third IEEE and ACM International Symposium on Mixed and Augmented Reality, Nov. 2-5, 2004, 10 pages.

* cited by examiner

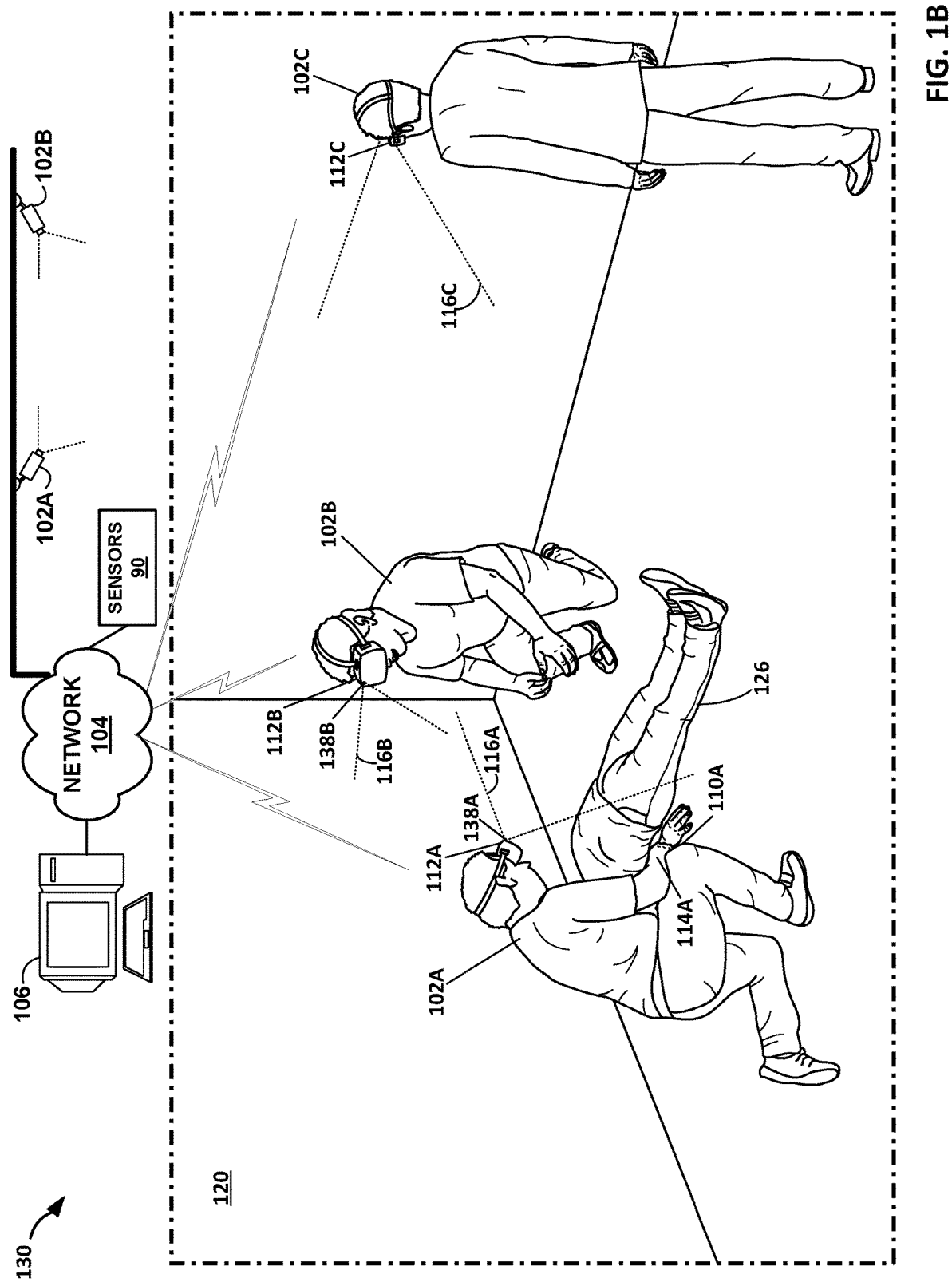

CO-LOCATED POSE ESTIMATION IN A SHARED ARTIFICIAL REALITY ENVIRONMENT

TECHNICAL FIELD

This disclosure generally relates to artificial reality systems, such as virtual reality, mixed reality, and/or augmented reality systems, and more particularly, pose estimation performed by artificial reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head mounted display (HMD) worn by a user and configured to output artificial reality content to the user. The artificial reality content may include completely-generated content or generated content combined with captured content (e.g., real-world video and/or images). Multiple users, each having their own HMD, may participate in a shared artificial reality experience.

SUMMARY

In general, this disclosure describes artificial reality systems and, more specifically, a pose tracking system that tracks pose and body positioning for multiple co-located participants, each having an artificial reality system that includes a head mounted display (HMD). Cameras or other sensors on the participants' HMDs cooperate to provide an accurate estimation of the pose and body position of each of the participants. The system does not require any markers to be to be placed on participants in order to determine pose or body position. Further, the system does not require any external cameras or sensors to determine a participant's pose and body position. Thus, the techniques described in the application can provide a "sandbox" AR/VR system that can be simpler and less costly to set up than previous systems.

Participants can join a shared artificial reality event or experience with others in the same location. Each participant's HMD can independently render artificial reality content for the participant based on the participant's pose and body position information obtained from other participants' HMDs. An HMD of a participant in the shared artificial reality event or experience can be referred to as a "participating HMD." The estimated pose and body position information for each participating HMD can be updated when a new frame is generated, or when there is a change in the pose or body position of a participant. The participants' HMDs can perform various operations to update the pose and body position information of the participants within the artificial reality content. For example, a participating HMD may calibrate positions of other participating HMDs into a joint artificial reality space (e.g., a shared map). Calibration of poses and body position information may improve over time as more pose and body position information is obtained.

A participating HMD may broadcast tracking estimates for body position information of co-located participants that are within the field-of-view of the HMD's cameras and/or sensors. The body position of a co-located participant may or may not be within the field-of-view of other participating HMDs. A participating HMD may receive body position information determined by other HMDs, and aggregate the received tracking information along with internal tracking information to construct an accurate, full estimate of its own pose and body positioning information for its corresponding participant. In this way, an HMD receives the two dimensional (2D) or three dimensional (3D) pose information and body position information from other participating HMDs. In some aspects, a participating HMD may use such 2D or 3D pose information and body position information to refine pose estimates and body position information for itself. In some aspects, a participating HMD can use the 2D or 3D pose information and body position information to "fill in" missing information with respect to the body position of its corresponding participant. For example, a user's lower body (e.g., lower torso, legs and feet) may not be within the field-of-view of the user's own HMD, but the user's lower body may be within the field-of-view of one or more other users' HMDs. The 2D or 3D pose and body position information received from these other HMDs can be used to fill in details regarding the body positioning of the user's lower body. Additionally, an HMD can use pose and body position information to refine previous estimates of pose and body position information. In some aspects, a participating HMD can use the 2D or 3D pose information and body position information to locate itself and other HMDs within the shared map.

Each participating HMD may broadcast its known 2D or 3D pose and body position information determined by the HMD to the other HMDs for use in constructing or updating the shared map. Each participating HMD may render artificial reality content using its copy of the shared map and the refined 2D or 3D pose and body position information determined by itself and as received from other HMDs, as described above.

A technical problem with conventional artificial reality systems is that markers or other indicia are typically used to determine the body position of users. In such conventional systems, markers or other indicia are placed at body positions of interest. Placement of markers can be cumbersome and time consuming thus leading to user dissatisfaction. Additionally, some conventional systems utilize external cameras (i.e., cameras not integrated with an HMD) to determine body position of users. This adds complexity and expense to an artificial reality system. The techniques disclosed herein provide a technical solution to the aforementioned technical problems. An HMD can receive pose and body position information from other HMDs participating in a multi-user artificial reality application. The receiving HMD can use the received pose and body position information to fill in missing information and refine existing estimates of body position information for co-located participants.

The aspects described above and further aspects described below can provide a technical improvement over conventional artificial reality system implementations, and can provide one or more practical applications, such as enabling an artificial reality system to accurately determine pose and body position information without the use of external image capture devices and without requiring the use of markers placed on the users body to indicate body position.

In one or more further example aspects, a method includes obtaining, from an image capture device of a first head mounted display (HMD), first image data representative of a physical environment; determining a first HMD pose representing a position and orientation of the first HMD; determining, from the first image data, first body position information of the users of one or more second HMDs within the physical environment; transmitting, by the first HMD, the first HMD pose and the first body position information for use by the one or more second HMDs; receiving, by the first HMD from each second HMD of the one or more second HMDs, a second HMD pose of the respective second HMD and second body position information determined by the second HMD from second image data obtained by the second HMD; integrating, by the first HMD, the first body position information with the second body position information to create first solved body position information of the user of the first HMD; and rendering, for display at the first HMD, artificial reality content in accordance with the first pose and the first solved body position information.

In one or more example aspects, an artificial reality system includes an image capture device configured to capture first image data representative of a physical environment; a first head mounted display (HMD) configured to output artificial reality content; a pose tracker configured to: determine a first HMD pose representing a position and orientation of the first HMD, determine, from the first image data, first body position information of the users of one or more second HMDs within the physical environment, transmit the first HMD pose and the first body position information for use by the one or more second HMDs, receive, from each second HMD of the one or more second HMDs, a second HMD pose of the respective second HMD and second body position information determined by the second HMD from second image data obtained by the second HMD, and integrate the first body position information with the second body position information to create first solved body position information of the user of the first HMD; and a rendering engine configured to render, for display at the first HMD, artificial reality content in accordance with the first HMD pose and the first solved body position information.

In one or more additional example aspects, a non-transitory, computer-readable medium comprises instructions that, when executed, cause one or more processors of an artificial reality system to obtain, from an image capture device of a first head mounted display (HMD), first image data representative of a physical environment; determine a first HMD pose representing a position and orientation of the first HMD; determining, from the first image data, first body position information of the users of one or more second HMDs; transmit, by the first HMD, the first HMD pose and the first body position information for use by the one or more second HMDs; receive, by the first HMD from each second HMD of the one or more second HMDs, a second HMD pose and second body position information determined by the second HMD from second image data obtained by the second HMD; integrate, by the first HMD, the first body position information with the second body position information to create first solved body position information of the user of the first HMD; and render, for display at the first HMD, artificial reality content in accordance with the first pose and the first solved body position information.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 1B is an illustration depicting another example artificial reality system that performs pose tracking including body position tracking for one or more co-located users, in accordance with the techniques of the disclosure.

Like reference characters refer to like elements throughout the figures and description.

DETAILED DESCRIPTION

Figure 1A:
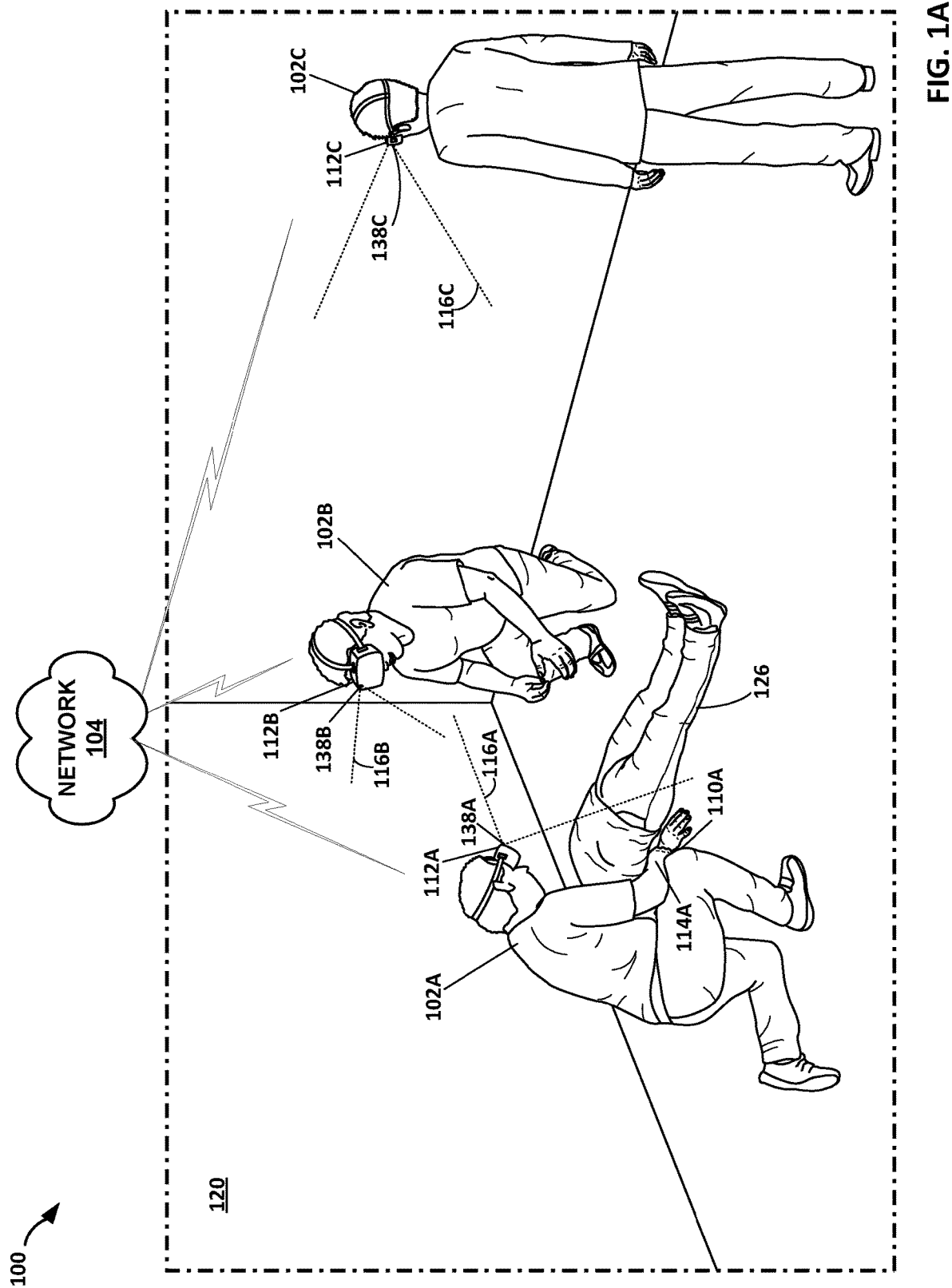
FIG. 1A is an illustration depicting an example artificial reality system that performs pose tracking including body position tracking for one or more co-located users, in accordance with the techniques of the disclosure.

FIG. 1A is an illustration depicting an example artificial reality system 100 that performs pose tracking and body position tracking for one or more co-located users 102, in accordance with the techniques of the disclosure. In the example illustrated in FIG. 1A, artificial reality system 100 includes users 102A-102C (collectively, "users 102") wearing head-mounted displays (HMDs) 112A-112C (collectively, "HMDs 112), respectively.

Each of HMDs 112 is worn by one of users 102 and includes an electronic display and optical assembly for presenting artificial reality content to user 102. In addition, HMD 112 may include one or more motion sensors (e.g., accelerometers) for tracking motion of the HMD 112 and may include one or more image capture devices 138, e.g., cameras, infrared (IR) detectors, Doppler radar, line scanners and the like, for capturing image data of the surrounding physical environment 120. For example, user 102A wears HMD 112A having image-capture device 138A. Image-capture device 138A defines a field-of-view 116A. A user 102 can be referred to as a co-located user when the user 102 is within the same physical environment as at least one other user with an HMD, and may therefore be within the field-of-view of an image capture device or within a sensor range of the at least one other user's HMD.

In some example implementations, artificial reality system 100 generates and renders artificial reality content to a user 102 based on one or more detected poses of an HMD 112 worn by user 102 and on body position information of users 102 that are within the field of view 138 of the user's HMD 112. In the example implementation illustrated in FIG. 1A, each of HMDs 112 operates as a stand-alone, mobile artificial reality system. The HMDs 112 participating in a shared artificial reality experience may be communicably coupled via a network 104, which may be a wired or wireless network, such as WiFi, a mesh network or a short-range wireless communication medium. For example, the colocation of the users 102 in the same physical environment can facilitate the use of Bluetooth or other short range local or personal area network technology.

In general, artificial reality system 100 uses information captured from a real-world, 3D physical environment 120 to render artificial reality content for display to user 102. In the example of FIG. 1A, each user 102A, 102B and 102C views the artificial reality content constructed and rendered by an artificial reality application executing on the user's respective HMD 112 (e.g., 112A, 112B and 112C). In some examples, the artificial reality content may comprise a mixture of real-world imagery and virtual objects, e.g., mixed reality and/or augmented reality. In other examples, artificial reality content may be, e.g., a video conferencing application, a navigation application, an educational application, simulation, gaming applications, or other types of applications that implement artificial reality.

During operation, the artificial reality application constructs artificial reality content for display to user 102 by tracking and computing pose information for a frame of reference, typically a viewing perspective of HMD 112. Additionally, the artificial reality application may track body position information for the user of HMD 112 and for other users visible to user 102 via the user's HMD 112. Using HMD 112 as a frame of reference, and based on a current field of view 130 as determined by current estimated pose of HMD 112, the artificial reality application renders 3D artificial reality content which, in some examples, may be overlaid, at least in part, upon the real-world, 3D physical environment 120 of a user 102. During this process, the artificial reality application uses sensed data received from HMD 112, such as movement information and user commands to capture 3D information within the real world, physical environment, such as motion by user 102 and/or motion of one or more hand-held controllers. Based on the sensed data, the artificial reality application determines a current pose for the frame of reference of HMD 112, body position information for the user and other users within the field of view of the user's HMD 112. Further, the artificial reality application can receive information from other user's HMDs 112 such as 2D or 3D pose and body position information sensed and/or determined by the other HMDs 112. The information determined by the user's HMD 112, and the information received from the other user's HMDs 112 may be partial or incomplete. For example, the information may lack pose or body position information with respect to portions of collocated users' bodies that are not within the field-of-view of a user's own HMD 112. Other users' HMDs 112 may be able to supply some or all of the missing information, and different HMDs 112 may supply different portions of body position information depending on the portions that are within the field-of-view of the respective HMDs. Thus, even if one user's HMD 112 is not able to determine the other co-located users' 3D poses or body position information using its own data, the HMD 112 may utilize 2D or 3D pose and body position information received from other co-located HMDs to fill in and augment its own information and use such additional information to more accurately solve 3D pose and body position information for both itself and other co-located users.

Additionally, in some aspects, the artificial reality system 100 may maintain a shared map indicating the positioning of the user 112 with respect to other users of the artificial reality system 100. The shared map may be generated and maintained based on information received from each participating user's HMD 112. In accordance with the shared map, current poses and skeletal positioning information, the artificial reality application renders the artificial reality content.

FIG. 1B is an illustration depicting another example artificial reality system 130 that performs pose tracking and body position tracking for one or more co-located users 102, in accordance with the techniques of the disclosure. The example illustrated in FIG. 1B includes HMDs 112 that may be similarly configured to those discussed above with reference to FIG. 1A. In the example illustrated in FIG. 1B, the artificial reality system 130 includes a console 106, and may optionally include external cameras such as cameras 102A and 102B. Additionally, artificial reality system 130 may optionally include external sensors 90.

In the example illustrated in FIG. 1B, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMDs 112, cameras 102, and sensors 90 may, as shown in this example, be communicatively coupled via network 104, which as discussed above, may be a wired or wireless network, such as WiFi, a mesh network or a short-range wireless communication medium.

In the example illustrated in FIG. 1B, some or all of the functions described as being performed by the HMDs 112 of FIG. 1A may be offloaded to console 106. For example, console 106 may receive image data from cameras on HMD 112 and optionally external cameras 102, sensor data from sensors 90, and pose information from each HMD 112. Console 106 may use the received data to render artificial reality content for display to each of users 102 via their respective HMDs 112. As discussed above, in some examples, the artificial reality content may comprise a mixture of real-world imagery and virtual objects, e.g., mixed reality and/or augmented reality. In other examples, artificial reality content may be, e.g., a video conferencing application, a navigation application, an educational application, simulation, gaming applications, or other types of applications that implement artificial reality.

Additionally, console 106 may maintain a shared map indicating the positioning of each of the users 102 with respect to other users of the artificial reality system 100. The shared map may be generated and maintained based on information received from each participating user's HMD 112. In accordance with the shared map, current poses and body position information, the artificial reality application renders the artificial reality content.

The example artificial reality systems 100, 130 illustrated in FIGS. 1A and 1B represent a use case in which a physical environment 120 includes users 102A, 102B and 102C that are participating in a training exercise for first responders. The physical environment 120 for this example includes an accident victim 126. Example artificial reality content corresponding to this training example and the physical environment 120 depicted in FIGS. 1A and 1B are presented with respect to FIG. 2 discussed below. Artificial reality content for a multi-player game can also be generated. Other example use cases are possible and within the scope of the disclosure.

Figure 1C:
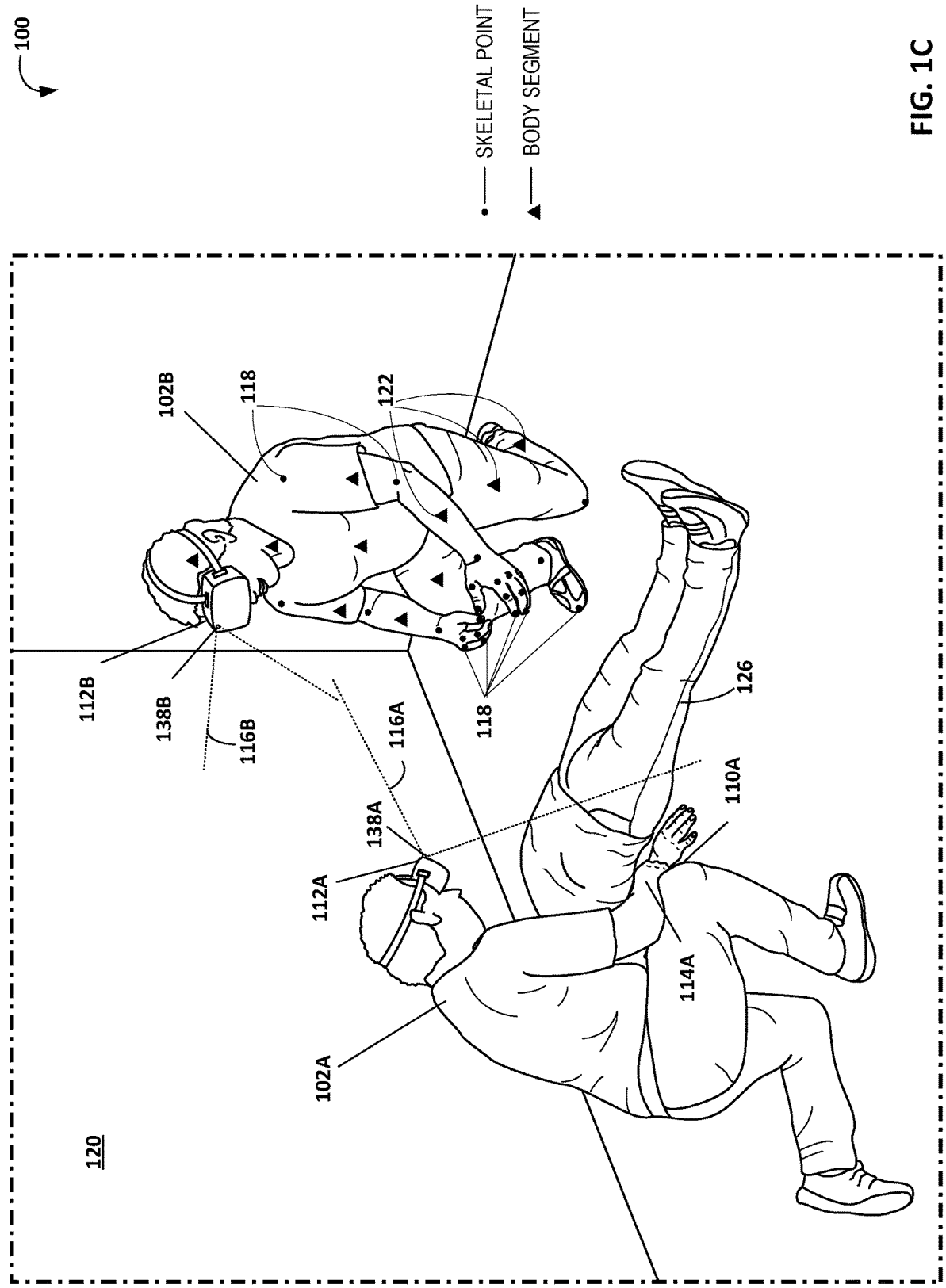
FIG. 1C illustrates further aspects of the artificial reality system described in FIGS. 1A and 1B.

FIG. 1C illustrates further aspects of the artificial reality system 100, 130 described in FIGS. 1A and 1B. As discussed above, artificial reality system 100 receives body position information from a user's HMD 112. In some aspects, the body position information can be skeletal positioning information. The skeletal positioning information can include 2D or 3D positioning information for skeletal points within a field-of-view of an HMD 112. The skeletal positioning information can include information for both the user of the HMD 112 and for other users in the physical environment 120. In the example illustrated in FIG. 1C, HMD 112A of user 102A has an image sensor 138A having a field-of-view indicated by dashed lines 116A. Various skeletal points 118 on user 102B are within the field-of-view 116A of image sensors 138A of HMD 112A. As an example, skeletal points 118 for user 102B that are detected by image sensor 138A of HMD 112A may include the shoulders, elbows, wrist joints, finger joints, fingertips, etc. of user 102B.

In some aspects, the body position information can be body segment position information. The body segment information can include 2D or 3D positioning information for body segments within a field-of-view of an HMD 112. A body segment can be a region of the body, for example, a head, trunk, arms, forearms, hands, thighs, legs, and feet of a participant. The body segment position information can include information for both the user of the HMD 112 and for other users in the physical environment 120.

In some aspects, the body position information may include both skeletal position information and body segment position information.

The body position information may be shared by HMD 112A with other co-located participating HMDs 112 (e.g., HMDs 112B and 112C) for use by artificial reality applications in creating artificial reality content for HMDs 112B and 112C. As an example, the artificial reality content displayed to user 102B via HMD 112B can be generated using information on skeletal points 118 and/or body segments 122 shared by HMD 112A, some of which may not be detectable by image capture devices 138B or other sensors of HMD 112B (e.g., due to occlusion by user 112B's body portions or other objects).

The pose and body position information provided by other users' HMDs can be used to fill in and refine the skeletal position information determined by the first HMD. For example, the body position information received from HMDs 112B and 112C can be used by HMD 112A to both fill in and refine the body position information determined on HMD 112A from the image data from HMD 112A. Each HMD 112 can independently determine pose and body position information based on 2D or 3D body position information received from other HMDs of co-located participants. For example, HMD 112A may not be able to determine the pose and body position information of other participants based solely on the data acquired by HMD 112A's own image capture devices. However, using information received from other co-located HMDs (e.g., HMDs 112B and 112C), HMD 112A can determine pose and body position information for itself and other co-located users. The body position information determined by HMD 112A and the body position information received from other co-located HMDs need not be complete in order for HMD 112A to determine pose and body position information for itself and co-located participants. Instead, HMD 112A can use 2D or 3D full or partial body position information determined by itself combined with 2D or 3D full or partial body position information received from other HMDs to accurately determine 3D pose and body position information for itself and co-located users. HMDs 112B and 112C can perform similar operations to use 2D or 3D full or partial body position information received from other participating HMDs to accurately determine 3D pose and body position information for themselves and other co-located participants. Accordingly, the techniques of the disclosure provide specific technical improvements to the computer-related field of rendering and displaying content by an artificial reality system. For example, artificial reality systems as described herein may provide a high-quality artificial reality experience to a user, such as user 102, of the artificial reality application by generating and rendering accurate pose and positioning information for a user 102 even when some pose and/or skeletal positioning information is not locally available to an HMD 112 of the user 102.

Figure 2:
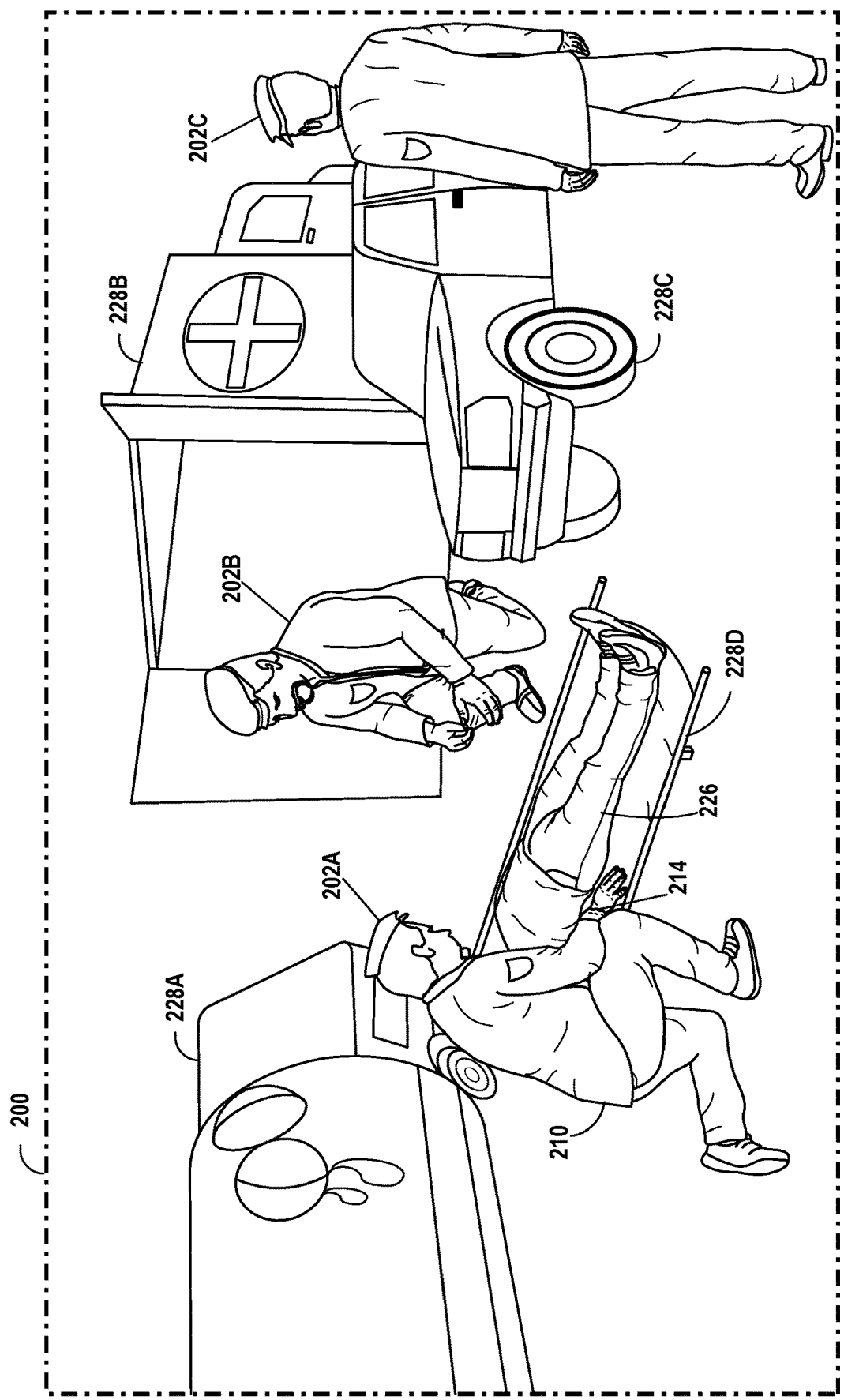
FIG. 2 illustrates example artificial reality content that may correspond to the example physical environment of FIGS. 1A and 1B.

FIG. 2 illustrates example artificial reality content 200 that may correspond to the example physical environment 120 of FIGS. 1A and 1B. Reference will be made to elements of FIGS. 1A and 1B in order to assist in the description of aspects illustrated in FIG. 2. As discussed above, artificial reality system 100, 130 is configured to generate artificial reality content 200 based at least in part on one or more physical objects within physical environment 120. Each of HMDs 112 is configured to render and output artificial reality content from the point-of-view of the respective HMD 112. For example, artificial reality content 200 of FIG. 2 is generated and rendered from the point-of-view of HMD 112C of user 102C from FIGS. 1A and 1B, an observer of a training exercise. Thus, artificial reality content 200 may include one or more graphical or virtual objects, some or all of which may correspond to physical objects within physical environment 120. In the example illustrated in FIG. 2, artificial reality content 200 may include avatars 202A, 202B, and 202C (collectively, "avatars 202") that correspond to the physical bodies of users 102A, 102B and 102C, respectively, from FIGS. 1A and 1B. Artificial reality system 100, 130 may be configured to generate and render each of avatars 202 to have a same or similar pose or orientation as the pose of the physical body of its corresponding user 102. For example, as shown in FIG. 2, avatars 202A and 202B are depicted as kneeling on one knee, corresponding to users 102A and 102B, respectively, who are also each kneeling on one knee.

For various reasons, any one of HMDs 112 may not be able to accurately render one or more virtual objects or avatars 202 from its own point of view. In one example, the image frame rendered by an artificial reality application on a display screen of a user's HMD may contain more image data than what is within the field-of-view 116 of a particular image-capture device 138. Accordingly, HMD 112 may fail to identify some or all of a physical body of a user 102 that is not captured by its respective image-capture device 138. For example, as shown in FIG. 1A, the right knee 110A and right hand 114A of user 102A do not fall within the field of view 116A of image-capture device 138A, however, these physical elements may still fall within the image displayed on user 102A's HMD 112A. Accordingly, HMD 112A may be unable to accurately render virtual representations of these physical body parts for display on the display screen.

In other examples, even if a physical object falls within the field-of-view 116 of a particular image-capture device 138, artificial reality system 100, 130 may experience difficulty identifying the physical object, thereby preventing artificial reality system 100 from rendering and outputting a corresponding virtual object. For example, even if right knee 110A of user 102A was within the field-of-view 116A of image-capture device 138A, right knee 110A would appear in the captured 2D imagery as a relatively large, rounded object with no identifying features that would enable image-recognition software to identify it as a knee of user 102. Accordingly, HMD 112A may unable to accurately render a virtual representation of this body part for display on the display screen.

In other examples, part or all of the body of a user 102 may be sufficiently occluded from a specific image capture device 138, such as by clothing (particularly loose or baggy clothing) another body part, or other interfering physical object, such that an HMD 112 or console 106 of artificial reality system 100 may be unable to identify the relative pose of the respective body part, or even the presence of the respective body part itself, and accordingly is unable to render a corresponding avatar 202 having the same pose.

In some examples in accordance with this disclosure, artificial reality system 100, 130 is configured to perform pose tracking and body position tracking for one or more of users 102, where some or all of an individual user's pose or body position is not trackable by a first user's own HMD. Other users' HMDs can provide pose and body position information to fill in the missing information and further refine existing information thereby facilitating accurate rendering of the pose and body positioning of co-located users. Thus, artificial reality system 100 can accurately generate artificial reality content 200 having avatars that are virtual representations 202 of users 102 in the same or similar poses as the corresponding users' physical bodies.

An HMD 112 or console 106 of artificial reality system 100, 130 is configured to receive 2D or 3D image data from image-capture devices 138 within artificial reality system 100, 130. Based on the received 2D or 3D image data, the HMDs 112 or console 106 of artificial reality system 100, 130 can be configured to determine (e.g., estimate) the relative positions of each of image-capture devices 138 via inside-out tracking. Inside-out tracking refers to tracking objects outside an HMD 112 using cameras or other sensors inside or on the HMD 112. For example, artificial reality system 100 is configured to identify two or more objects within the received image data, and based on the relative orientations of the two or more objects with respect to one another in the various images, estimate the relative distance between and/or orientations of image-capture devices 138 with respect to one another.

In the example depicted in FIG. 1A, HMD 112A or console 106 of artificial reality system 100 can be configured to receive pose and body position information from HMDs 112B and 112C respectively. HMD 112A (or console 106), can use the received pose and body position information, along with pose and body information that is locally available to HMD 112A, to determine pose and body position information of limbs or other body parts of their own bodies and the physical body of user 102A. In the example illustrated in FIG. 1B, console 106 of artificial reality system 130 can be configured to receive image data from image capture devices 138A, 138B and 138C, and, optionally, external cameras 102 and identify from the images, pose information and body position information of limbs or other body parts of users 102A, 102B and 102C.

Based on the identified physical body parts of user 102A in the image data, artificial reality system 100, 130 is further configured to determine a three-dimensional (3D) pose and body positioning of user 102A. For example, based on a relative orientation of one or more identified limbs of user 102A, artificial reality system 100, 130 may be configured to construct an avatar 202A having limbs in the same relative orientation as the limbs of user 102A.

Artificial reality system 100, 130 may repeat this process for each of users 102 within physical environment 120. For example, in the scenario depicted in FIGS. 1A and 1B, HMD 112B of artificial reality system 100, 130 may receive pose and body position information determined from image data provided by image-capture devices 138A and 138C depicting user 102B. Similarly, HMD 132C of artificial reality system 100 may receive pose and body position information determined from image data provided by image capture devices 138A and 138B depicting user 102C. Additionally, HMD 112A of artificial reality system 100 may determine or identify pose and body position information for users 102B and 102C based on the received image data from image capture devices 132A.

Once an HMD 112 of artificial reality system 100 has identified pose and body position information for each of users 102, HMD 112 may transfer (e.g., wirelessly broadcast) the pose data and body position information to each of the other co-located HMDs 112 in the artificial reality system 100. Based on the received pose data and body position information, each HMD 112 may generate and display artificial reality content 200 depicting a virtual or augmented reality environment from the point-of-view of the respective HMD 112. Artificial reality content 200 may include avatars 202 corresponding to the users' physical bodies 102 that are otherwise obscured, occluded, unidentifiable or out-of-view of the image-capture device 138 of the user's respective HMD 112. For example, as shown in FIG. 2, artificial reality content 200 includes a virtual knee 210 and virtual hand 214, even though these virtual objects' respective physical counterparts 110A, 114A are out-of-view of image-capture device 138A (FIGS. 1A and 1B).

Figure 3A:
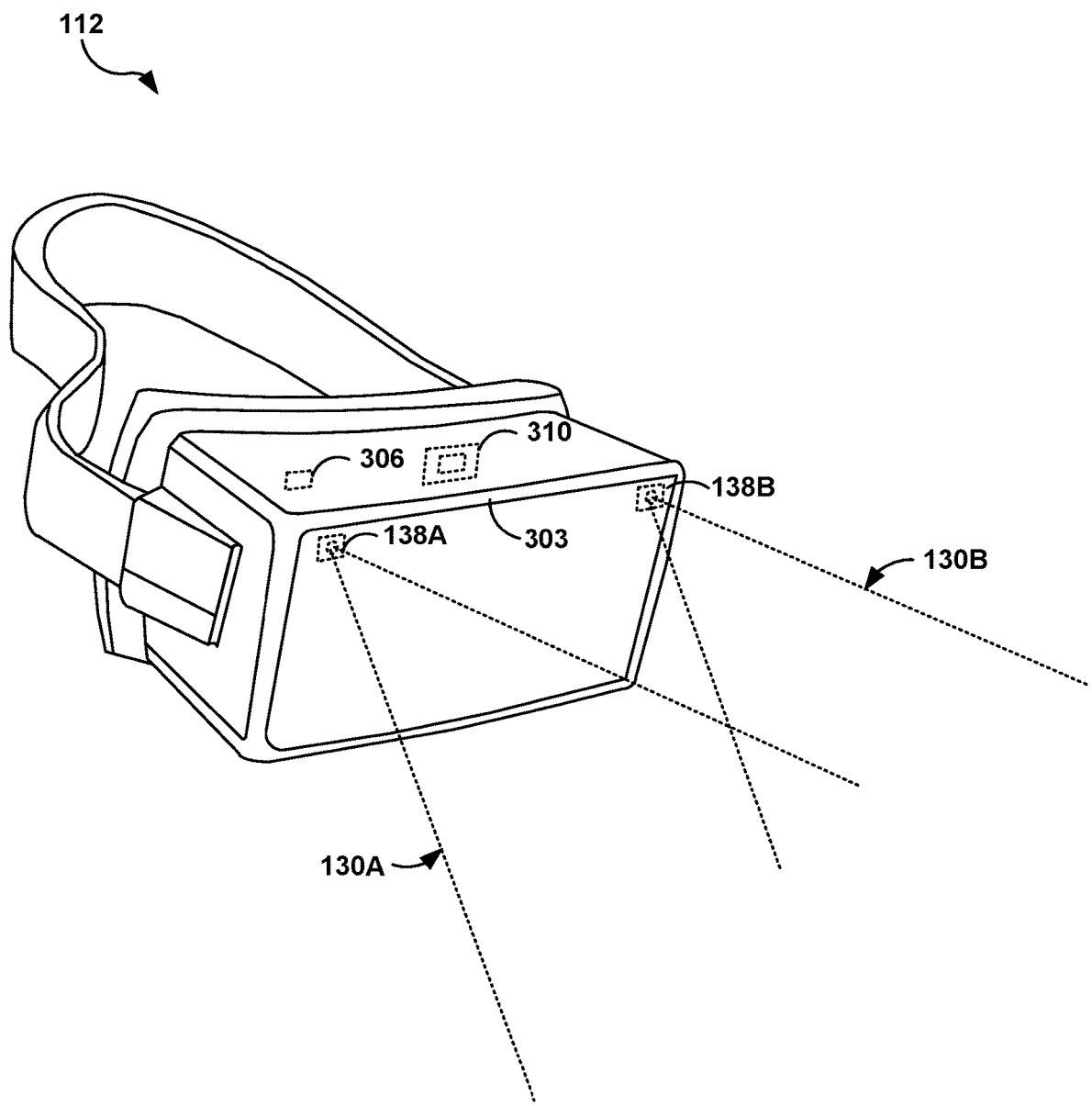
FIG. 3A is an illustration depicting an example HMD that operates in accordance with the techniques of the disclosure.

FIG. 3A is an illustration depicting an example HMD 112 configured to operate in accordance with the techniques of the disclosure. HMD 112 of FIG. 3A may be an example of any of HMDs 112 of FIGS. 1A and 1B. HMD 112 may operate as a stand-alone, mobile artificial realty system configured to implement the techniques described herein or may be part of an artificial reality system, such as artificial reality systems 100, 130 of FIGS. 1A, 1B.

In this example, HMD 112 includes a front rigid body and a band to secure HMD 112 to a user. In addition, HMD 112 includes an interior-facing electronic display 303 configured to present artificial reality content to the user. Electronic display 303 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 303 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 3A, in this example, HMD 112 further includes one or more motion sensors 306, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, still cameras, IR scanners, UV scanners, laser scanners, Doppler radar scanners, depth scanners, or the like, configured to output image data representative of the physical environment. In some aspects, the image capture devices 138 can capture image data from a visible spectrum and an invisible spectrum of the electromagnetic spectrum (e.g., IR light). The image capture devices 138 may include one or more image capture devices that capture image data from the visible spectrum and one or more separate image capture devices that capture image data from the invisible spectrum, or these may be combined in the same one or more image capture devices. More specifically, image capture devices 138 capture image data representative of objects in the physical environment that are within a field of view 130A, 130B of image capture devices 138, which typically corresponds with the viewing perspective of HMD 112. HMD 112 includes an internal control unit 310, which may include an internal power source and one or more printed-circuit boards having one or more processors, memory, and hardware to provide an operating environment for executing programmable operations to process sensed data and present artificial reality content on display 303.

In one example, in accordance with the techniques described herein, control unit 310 is configured to, based on the sensed image data, determine body position information for a user of HMD 112 and for other co-located users within a physical environment 120 (FIGS. 1A-1C). When within the field of view of the image capture devices 138, the control unit 310 can detect body position information within the image data and use the body position information determined locally along with body position information received from other HMDs 112 and other sensor information to determine pose and body position information for the user of HMD 112 and other co-located users.

Figure 3B:
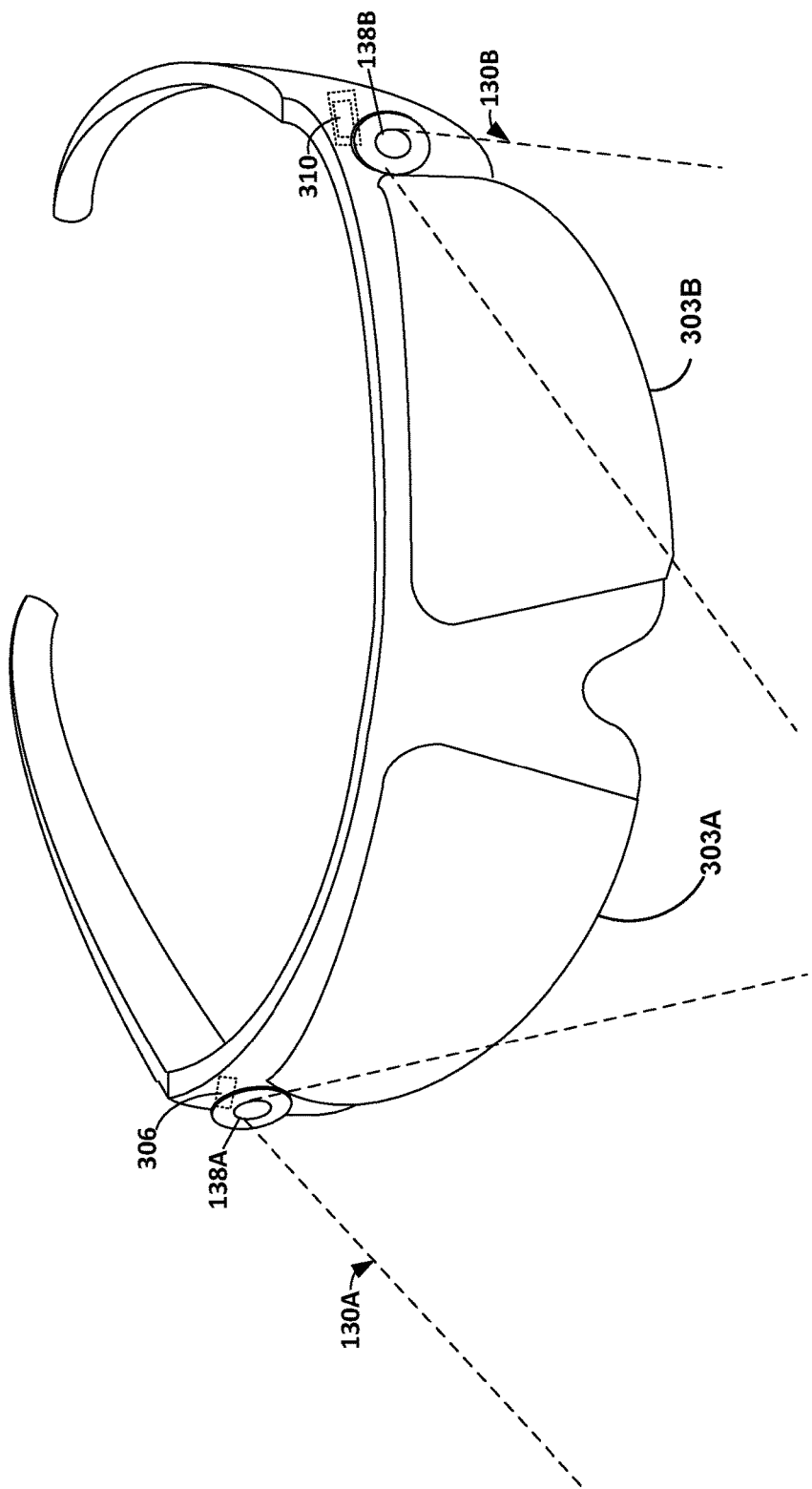
FIG. 3B is an illustration depicting another example HMD that operates in accordance with the techniques of the disclosure.

FIG. 3B is an illustration depicting an example HMD 112, in accordance with techniques of the disclosure. As shown in FIG. 3B, HMD 112 may take the form of glasses. HMD 112 of FIG. 3B may be an example of any of HMDs 112 of FIGS. 1A and 1B. HMD 112 may be part of an artificial reality system, such as artificial reality systems 100, 130 of FIG. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 3B includes interior-facing electronic displays 303A and 303B (collectively, "electronic displays 303") configured to present artificial reality content to the user. Electronic displays 303 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 3B, electronic displays 303 form a stereoscopic display for providing separate images to each eye of the user. In some examples, the known orientation and position of display 303 relative to the front frame of HMD 112 is used as a frame of reference, also referred to as a local origin, when tracking the position and orientation of HMD 112 for rendering artificial reality content according to a current viewing perspective of HMD 112 and the user.

As further shown in the example illustrated in FIG. 3B, HMD 112 further includes one or more motion sensors 306, such as one or more accelerometers (also referred to as inertial measurement units or "IMUS") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 310, which may include an internal power source and one or more printed-circuit boards having one or more processors, memory, and hardware to provide an operating environment for executing programmable operations to process sensed data and present artificial reality content on display 303.

Figure 4:
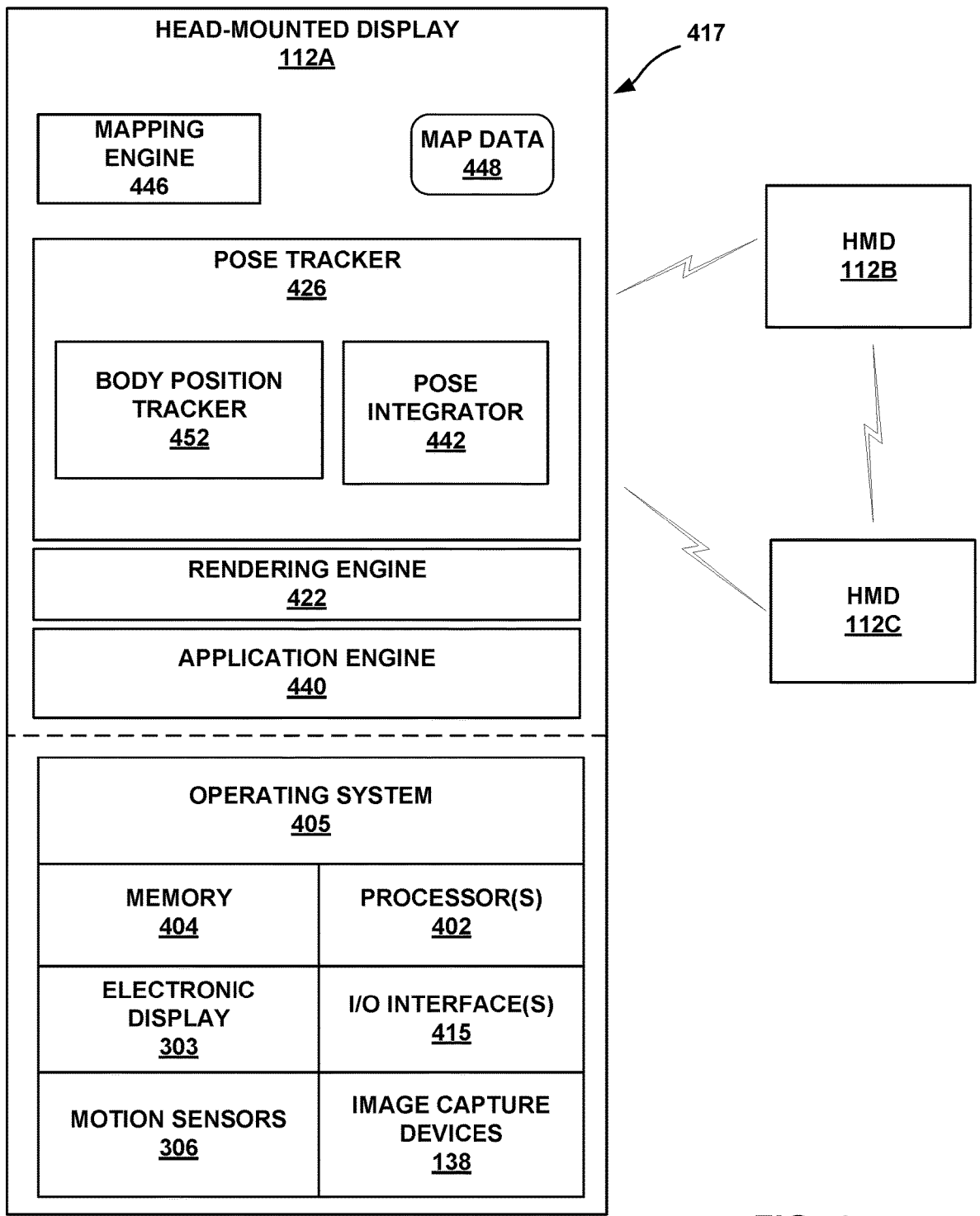
FIG. 4 is a block diagram depicting an example in which pose tracking including body positioning for co-located users is performed by an example instance of the HMD of the artificial reality systems of FIG. 1A in accordance with the techniques of the disclosure.

FIG. 4 is a block diagram depicting an example in which pose tracking including body position tracking for co-located users is performed by an example instance of the HMD 112A of the artificial reality system 100 of FIG. 1A in accordance with the techniques of the disclosure. In the example of FIG. 4, HMD 112A performs pose tracking including body position tracking for HMD 112A in accordance with the techniques described herein based on sensed data, such as motion data and image data received from an HMD 112A of the user and from HMDs 112B and 112C of other co-located users.

In this example, HMD 112A includes one or more processors 402 and memory 404 that, in some examples, provide a computer platform for executing an operating system 405, which may be an embedded, real-time multitasking operating system, for instance, or other type of operating system. In turn, operating system 405 provides a multitasking operating environment for executing one or more software components 417. Processors 402 are coupled to one or more I/O interfaces 415, which provide I/O interfaces for communicating with devices such as a keyboard, game controllers, display devices, image capture devices, other HMDs, and the like. Moreover, the one or more I/O interfaces 415 may include one or more wired or wireless network interface controllers (NICs) for communicating with a network, such as network 104. Additionally, processor(s) 402 are coupled to electronic display 303, motion sensors 306, and image capture devices 138. In some examples, processors 402 and memory 404 may be separate, discrete components. In other examples, memory 404 may be on-chip memory co-located with processors 402 within a single integrated circuit.

Software applications 417 of HMD 112A operate to provide an overall artificial reality application. In this example, software applications 417 include application engine 440, rendering engine 422, pose tracker 426, and mapping engine 446.

In general, application engine 440 includes functionality to provide and present an artificial reality application, e.g., a teleconference application, a gaming application, a navigation application, an educational application, training or simulation applications, and the like. Application engine 440 may include, for example, one or more software packages, software libraries, hardware drivers, and/or Application Programming Interfaces (APIs) for implementing an artificial reality application on HMD 112A. Responsive to control by application engine 440, rendering engine 422 generates 3D artificial reality content for display to the user by application engine 440 of HMD 112A.

Application engine 440 and rendering engine 422 construct the artificial content for display to user 102 in accordance with current pose of HMD 112A and available body position information within a frame of reference, typically a viewing perspective of HMD 112A, as determined by pose tracker 426. Based on the current viewing perspective and on pose information and body positioning information received from other users' HMDs 112B and 112C, rendering engine 422 constructs the 3D, artificial reality content which may in some cases be overlaid, at least in part, upon the real-world 3D environment of user 102. During this process, pose tracker 426 operates on data received from HMD 112A such as image data from image capture devices 138 and motion sensors 106, such as movement information and user commands to capture 3D information within the real world environment, such as motion by user 102, and/or feature tracking information with respect to user 102. Pose tracker 426 also operates on similar data received from other co-located users' similarly configured HMDs 112B and 112C that capture 2D and 3D information with the image capture devices and sensors on the other co-located users' HMDs 112B and 112C. Based on both the data gathered on the local HMD 112A and the data received from other co-located users' HMDs 112B and 112C, pose tracker 426 determines a current pose and body position for the user of HMD 112A within the frame of reference of HMD 112A and, in accordance with the current pose and skeletal positioning information, constructs the artificial reality content for display to user 102.

Pose tracker 426 includes a body position tracker 452 and a pose integrator 442. Body position tracker 452 analyzes image data received via image capture devices 138 and other sensor data to determine body positioning of co-located users that appear in the image data. In some aspects, body position tracker 452 can process the image data through a machine learning model that has been trained to recognize various body positions. For example, in some aspects the machine learning model may be trained to recognize skeletal positions, including joints such as knees, wrists, shoulders etc. In some aspects, the machine learning model may be trained to recognize body segments such as head, neck, torso, arm, forearm, thigh, leg and foot segments. In some aspects, the machine learning model may be trained to recognized both skeletal points and body segments. The body position tracker 452 can analyze the image data to determine body position information for both the user of HMD 112A and for other co-located users that appear in the image data. The body position information can include a confidence level, perhaps assigned by the machine learning model, for the body positions detected by the body position tracker 452.

Pose integrator 442 integrates pose and body position information as determined on HMD 112A with pose and body position information as determined on other co-located HMDs (e.g., HMD 112B and 112C). Pose integrator 542 can receive 2D or 3D pose and body position information from co-located HMDs via network 104. The 2D or 3D pose and body position information may be partial information, i.e., incomplete information regarding pose and body positions of the co-located users. Pose integrator 442 can then integrate the locally determined pose and body position information along with pose and body position information received from co-located HMDs to solve accurate pose and body position information for all co-located users within a field of view of HMD 112A. In some aspects, the accuracy of the pose and body position may be increased due to the availability of body position information determined from image data taken from different angles of the various co-located users. Further, the accuracy of the pose and body position information may be enhanced due to the availability of body position information that can be used to fill-in or augment body position information that is not locally available to HMD 112A. For example, HMD 112A can use pose and body position information received from other HMDs (e.g., HMD 112B and/or HMD 112C) to fill in or augment pose and body position information determined from image data and other data local to HMD 112A.

The pose integrator 442 can use various data to solve the pose and body positions of the co-located users. For example, in some aspects, the pose integrator 442 may use the confidence levels associated with the body position information in order to determine which body position data to use, or to weight the influence of the body position data.

In some aspects, HMD 112A may include a mapping engine 446 configured to generate mapping data 448 of a physical 3D environment using mapping information received from co-located HMDs 112. Mapping engine 446 may receive the mapping information in the form of images captured by image capture devices 138 at local poses of HMDs 112 and/or tracking information for HMDs 112, for example. Mapping engine 446 may process the image data to identify map points for determining topographies of the scenes in the images and use the map points to generate map data 448 that is descriptive of an area of the physical 3D environment in which HMD 112A is operating. Mapping engine 446 may progressively generate a map for an area in which co-located HMDs 112 are operating over time.

Further details on the operation of pose tracker 426, including skeletal position tracker 452 and pose integrator 442 are provided below with respect to FIG. 6.

Figure 5:
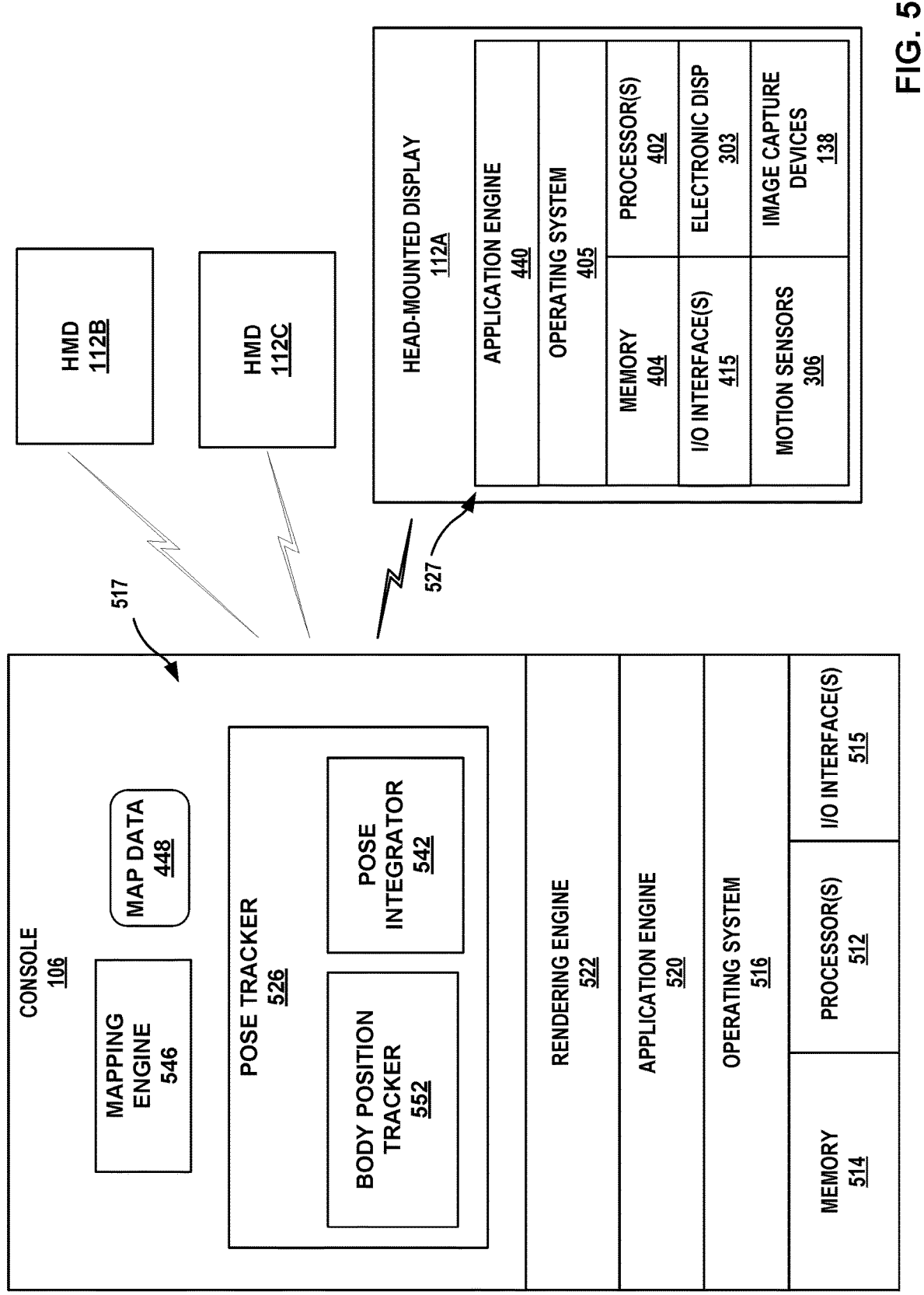
FIG. 5 is a block diagram showing example implementations in which pose tracking and body positioning for co-located users is performed by example instances of the console and the HMD of the artificial reality systems of FIG. 1B.

FIG. 5 is a block diagram showing example implementations in which pose tracking and body position tracking for co-located users is performed by example instances of the console and the HMD of the artificial reality systems of FIG. 1B. In the example of FIG. 5, console 106 performs pose tracking and rendering for HMDs 112A, 112B and 112C in accordance with the techniques described herein based on sensed data, such as image and motion data received from HMDs 112A, 112B and 112C.

In this example, similar to FIG. 4, HMD 112A includes one or more processors 402 and memory 404 that, in some examples, provide a computer platform for executing an operating system 405, which may be an embedded, real-time multitasking operating system, for instance, or other type of operating system. In turn, operating system 405 provides a multitasking operating environment for executing one or more software components 527. Moreover, processor(s) 402 are coupled to electronic display 303, motion sensors 306, and image capture devices 138. HMDs 112B and 112C may be configured similarly to HMD 112A.

In general, console 106 is a computing device that processes image and skeletal position information received from cameras 102 (FIG. 1B) and/or HMDs 112 to perform pose tracking, and content rendering for HMDs 112. In some examples, console 106 is a single computing device, such as a workstation, a desktop computer, a laptop, or gaming system. In some examples, at least a portion of console 106, such as processors 512 and/or memory 514, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 5, console 106 includes one or more processors 512 and memory 514 that, in some examples, provide a computer platform for executing an operating system 516, which may be an embedded, real-time multitasking operating system, for instance, or other type of operating system. In turn, operating system 516 provides a multitasking operating environment for executing one or more software components 517. Processors 512 are coupled to one or more I/O interfaces 515, which provide I/O interfaces for communicating with external devices, such as a keyboard, game controllers, display devices, image capture devices, HMDs, and the like. Moreover, the one or more I/O interfaces 515 may include one or more wired or wireless network interface controllers (NICs) for communicating with a network, such as network 104. Each of processors 402, 512 may comprise any one or more of a multi-core processor, a controller, a digital signal processor (DSP), an application specific integrated circuit (ASIC), a field-programmable gate array (FPGA), or equivalent discrete or integrated logic circuitry. Memory 404, 514 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 517 of console 106 operate to provide an overall artificial reality application. In this example, software applications 517 include application engine 520, rendering engine 522, pose tracker 526, and mapping engine 546.

In general, application engine 520 includes functionality to provide and present an artificial reality application, e.g., a teleconference application, a gaming application, a navigation application, an educational application, training or simulation applications, and the like. Application engine 520 may include, for example, one or more software packages, software libraries, hardware drivers, and/or Application Program Interfaces (APIs) for implementing an artificial reality application on console 106. Responsive to control by application engine 520, rendering engine 522 generates 3D artificial reality content for display to the user by application engines 440 of HMDs 112 (e.g., HMD 112A, 112B and 112C).

Application engine 520 and rendering engine 522 construct the artificial content for display to each of users 102 in accordance with current pose information for the user's respective HMD 112 and body position information within a frame of reference, typically a viewing perspective of the respective co-located HMD 112, as determined by pose tracker 526. Based on the current viewing perspective, rendering engine 522 constructs the 3D, artificial reality content which may in some cases be overlaid, at least in part, upon the real-world 3D environment of users 102. During this process, pose tracker 526 operates on sensed data received from each respective co-located HMD 112, such as image data from sensors on an HMD 112, and, in some examples, data from any external sensors 90 (FIG. 1B), such as external cameras, to capture 3D information within the real world environment, such as motion by user 102, and/or body position tracking information with respect to a user 102. Based on the sensed data, pose tracker 526 determines a current pose for each respective co-located HMD 112 within the frame of reference of the respective HMD 112 and, in accordance with the current poses and body position information, constructs the artificial reality content for communication, via the one or more I/O interfaces 415, 515, to HMDs 112 for display to users 102.

Similar to pose tracker 426 described above with respect to FIG. 4, pose tracker 526 includes body position tracker 552 and a pose integrator 542. Body position tracker 552 analyzes image data received via image capture devices and other sensor data to determine body positioning of co-located users that appear in the image data. In some aspects, body position tracker 552 can process the image data through a machine learning model that has been trained to recognize various body positions, including skeletal positions and body segment positions. The body position tracker 552 can analyze the image data received from the respective co-located HMDs to determine body position data for co-located users 102 that appear in the image data. The body position data can include a confidence level, perhaps assigned by the machine learning model, for the body positions detected by the body position tracker 552.

Pose integrator 542 integrates the pose and body position information position information as determined by the pose tracker 526 and body position tracker 552. Pose integrator 542 can then integrate the pose and body position information for each of the co-located HMDs to solve accurate pose and body position information for all co-located users within a field of view of each respective HMD 112. In some aspects, the accuracy of the pose and body position may be increased due to the availability of image data taken from different angles of the various co-located users.

The pose integrator 542 can use various data to solve the pose and skeletal positions of the co-located users. For example, in some aspects, the pose integrator 542 may use the confidence levels associated with the body positions in order to determine which skeletal position data to use, or to weight the influence of the skeletal position data.

In some aspects, console 106 may include a mapping engine 546 configured to generate mapping data 448 of a physical 3D environment using mapping information received from co-located HMDs 112. Mapping engine 546 may receive the mapping information in the form of images captured by image capture devices 138 of HMDs 112 and/or tracking information for HMDs 112, for example. Mapping engine 546 may process the images to identify map points for determining topographies of the scenes in the images and use the map points to generate map data 448 that is descriptive of an area of the physical 3D environment in which the co-located HMDs 112 are operating. Mapping engine 546 may progressively generate a map for an area in which co-located HMDs 112 are operating over time.

Further details on the operation of pose tracker 526, including skeletal position tracker 552 and pose integrator 542 are provided below with respect to FIG. 7.

Figure 6:
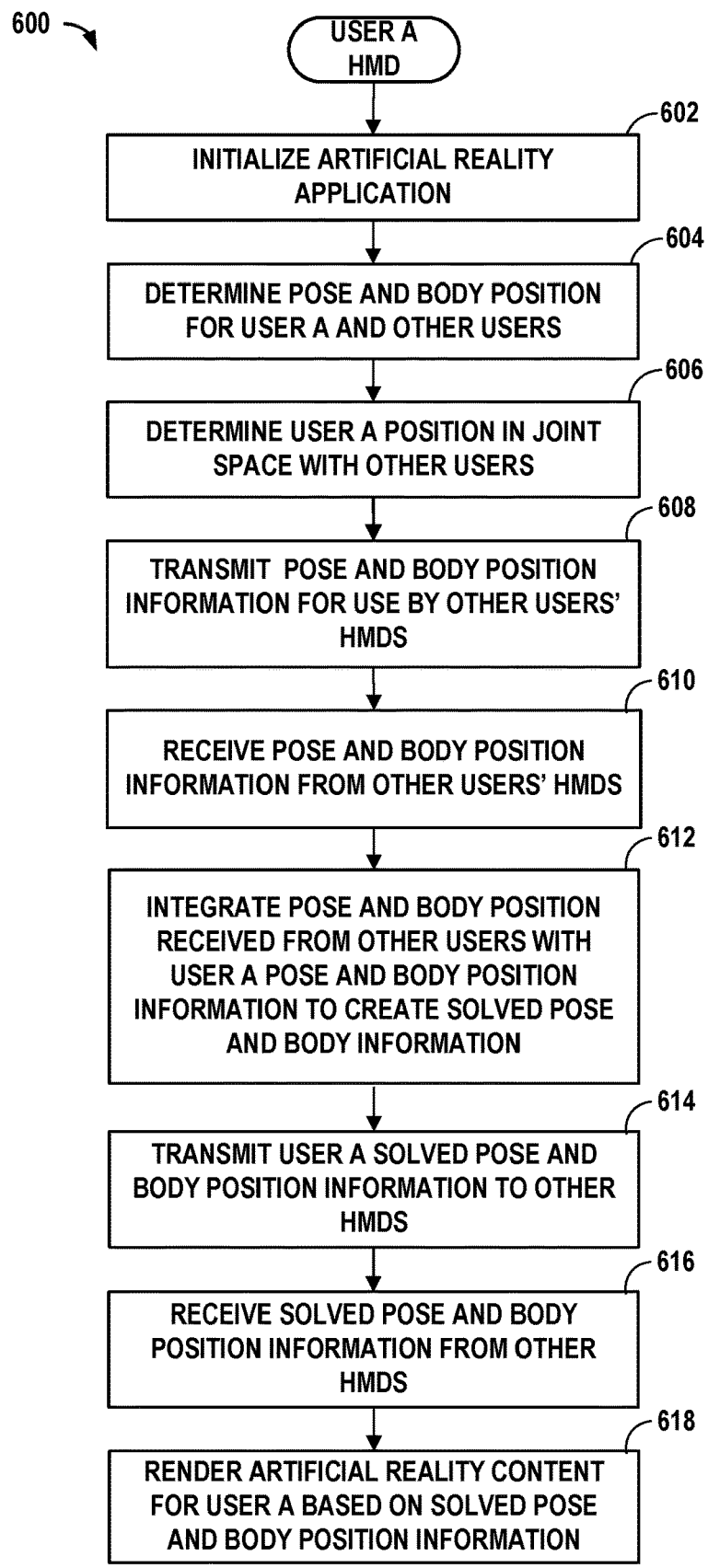
FIG. 6 is a flowchart illustrating example operations of a method for performing co-located pose estimation in accordance with aspects of the disclosure.

FIG. 6 is a flowchart 600 illustrating example operations of a method for determining pose and body positions for co-located users of HMDs in accordance with aspects of the disclosure. Some of the example operations described in flowchart 600 can be performed periodically or in response to an event. For example, the example operations can be performed as part of a response to a display frame generation event where the event causes an artificial reality system to render a display frame for presentation on HMD 112. The operations described below can be performed by each HMD 112 of co-located users that are participating in a multi-user artificial reality experience that is provided, at least in part, by an application engine on each co-located user's respective HMD 112. The operations below are described from the perspective of the HMD 112 of one of the co-located users.

An application engine on an HMD 112 can initialize a multi-user artificial reality application on an HMD 112 (602). In some aspects, if the HMD 112 is the first HMD to execute the application, the application may establish a wireless network. For example, the application may establish an ad hoc wireless network for use in communicating with the HMDs 112 of other co-located users that are participating in the application. If the HMD 112 is not the first HMD to execute the application, the HMD may join an already established network. In some aspects, application initialization procedures can also include obtaining permission from the user to share pose and body position information with the HMDs of other co-located users of the application. Further initialization procedures can include a mapping engine 446 initializing map data 448 with an estimate of the user's position and the position of other co-located users.

A pose tracker 426 of the HMD 112 can determine 2D or 3D pose and body position information for the user and co-located users that appear in the image data and other sensor data received from one or more on-board image capture devices 138 and perhaps other sensors of the HMD 112 (604). In some aspects, the body positions of the users appearing in the image data can be determined by passing the image data through a machine learning model that has been trained to recognize various body positions such as skeletal positions (e.g., joints such as elbows, wrists, shoulders, knees, hips etc.) and/or body segments (e.g., head, neck, trunk, arm, forearm, thigh, leg etc.). The body position information may be associated with confidence values for each joint, segment or other position that indicates the machine learning model's confidence in the position estimates. Other methods of body position recognition are possible and within the scope of the disclosure. In some aspects, the body positions are determined without the aid of markers or other devices placed on the joints, segments or other body parts used by conventional systems to identify body positions.

The HMD 112 can then determine the user's position in a joint mapping space with other co-located users (606). For example, a mapping engine 446 may use image data and other sensor data to determine relative positions of the user and other co-located users. The HMD 112 can then calibrate the user's position in the shared map with respect to the position of other co-located users.

The HMD 112 can transmit the pose and body position information as determined by HMD 112 for the users that are within the field-of-view of HMD 112 (and associated confidence values) over the network for use by other co-located HMDs participating in the artificial reality application (608). The transmitted pose and body position information may be 2D or 3D information. Further, the transmitted pose and body position information may be incomplete information. For example, body position information may be provided for joints or segments that are within the field-of-view of a respective HMD 112, and may omit data with respect to joins or segments that are not within the field-of-view of the respective HMD 112. The pose and body position information may be provided relative to a shared map. In some aspects, the pose and body position information may be a full set of information comprising relative or absolute positions within the shared map. In some aspects, only information that has changed from a previous frame is transmitted.

Similarly, the HMD 112 can receive pose and body position information from other co-located HMDs participating in the artificial reality application (610). The received pose and body position information may include pose and body position information for the user of HMD 112 as determined by the other co-located HMDs, and may include associated confidence levels representing the confidence that the co-located HMDs have in the values they provide. The body position information may be incomplete. For example, the body information received from an HMD 112 may only include information for joints and/or body segments that are within the field of view of the corresponding HMD 112. The received pose and body position information can be 2D or 3D information.

A pose integrator 442 on the user's HMD 112 can integrate the locally determined pose and body position information with the pose and body position information received from other co-located users' HMDs 112 to determine solved pose and body position information for the co-located users (612). The integration of the pose and body position information can be performed in various ways. For example, in some aspects, a confidence level of the pose and body position information received from other co-located HMDs 112 can be used to determine the solved pose and body position information for the user of HMD 112 performing the integration. For example, HMD 112A may determine a solved body position information for user 102A of HMD 112A. In some aspects, the body position information with the highest confidence level can be used as the solved body position. In some aspects, the solved body position information can be based on a combination of the body position information received from the HMDs 112 of co-located users. For example, the confidence level of each HMD's 112 body position information can be used to weight the respective HMD's contribution to a solved body position. In some aspects, preference or increased weight may be given to body position information that is closer to the user's HMD 112. In some aspects, HMD 112A may also determine solved body position information for the other co-located users (e.g., users of HMDs 112B and 112C). HMD 112A may use any of the aforementioned techniques to determine the solved body position information for other users.

Various techniques can be used to avoid overtaxing processing resources, especially in the case that there are many users participating in a multi-user artificial reality application. In some aspects, some data may be filtered out during the pose integration process. For example, pose and body position information received from users that are positioned past a predetermined or configurable threshold may be ignored. This may be desirable because data obtained from HMDs that are close may be more reliable than data from HMDs that are farther away. Similarly, in some aspects, pose and body position information received from the top n closest users may be used while information from users that are not in the top n closest users may be ignored. The value for n may vary depending on the number of co-located users present. A further technique can be to perform the integration operations only when a change in data values exceeds a predetermined or configurable threshold.

The HMD 112 then transmits the solved 3D pose and body position information for the user and co-located users to the other co-located HMDs via network 104 (614). The HMD 112 may also receive solved 3D pose and body position information from other co-located HMDs (616).

A rendering engine 422 on HMD 112 can render artificial reality content based on the solved pose and body position information (618). For example, the rendering engine can map avatar characteristics onto the solved body position information for the associated user so that the user's avatar is posed in the same position as determined by the solved body position information associated with the user. The avatar characteristics can include clothing, body shape, skin tone and other characteristics.

Figure 7:
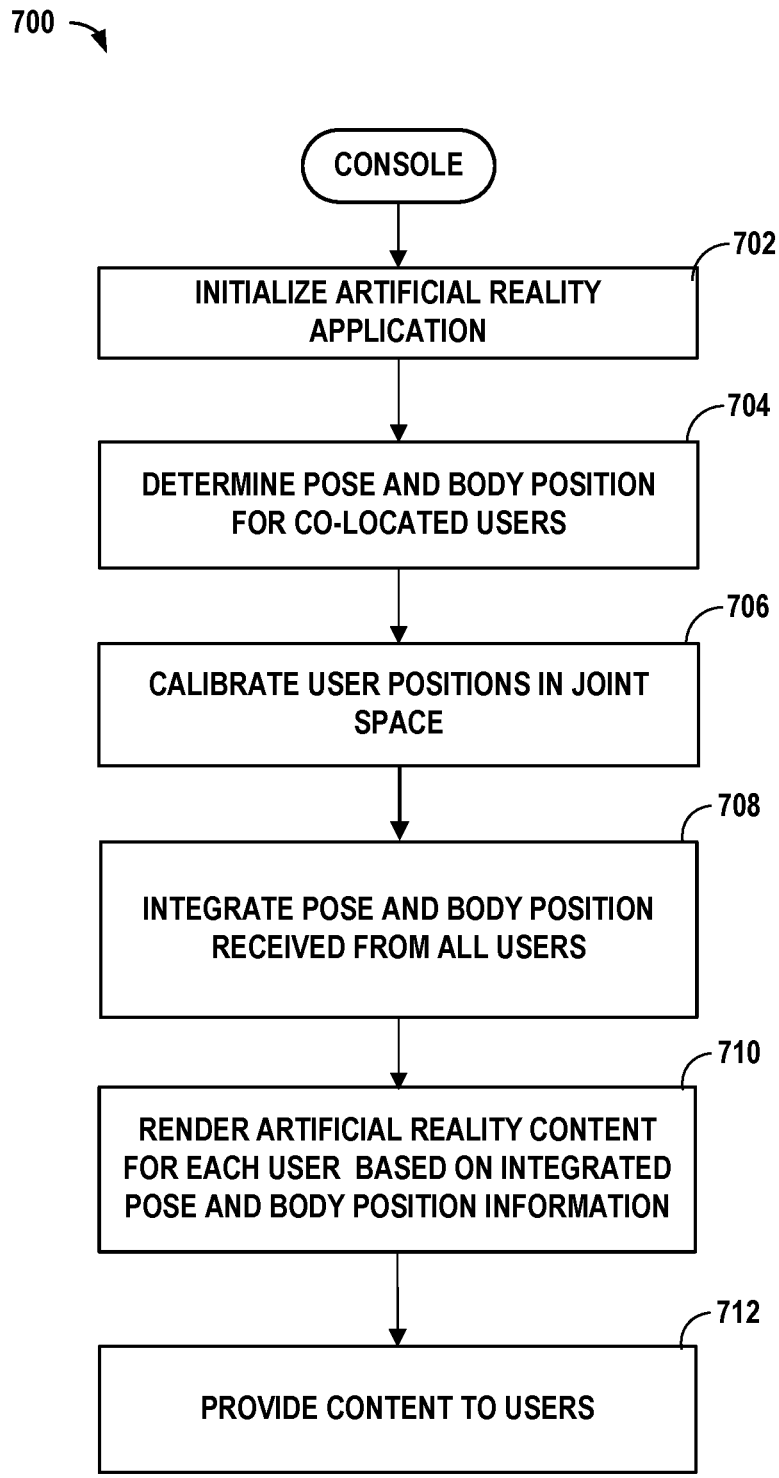
FIG. 7 is a flowchart illustrating example operations of another method for performing co-located pose estimation in accordance with aspects of the disclosure.

FIG. 7 is a flowchart 700 illustrating example operations of a method for determining pose and skeletal positions for co-located users of HMDs in accordance with further aspects of the disclosure. As with the flowchart 600 of FIG. 6, some of the example operations described in flowchart 600 can be performed periodically or in response to an event. For example, the example operations can be performed as part of a response to a display frame generation event where the event causes an artificial reality system to render a display frame for presentation on HMD 112. Some or all of the operations described below can be performed by a console 106 that communicates with HMDs 112 of co-located users that are participating in a multi-user artificial reality experience that is provided, at least in part, by an application engine on the console 106 and each co-located user's respective HMD 112.

An application engine on console 106 can initialize a multi-user artificial reality application (702). In some aspects, the console 106 may establish a wireless network. For example, the application may establish an ad hoc wireless network for use in communicating with the HMDs 112 of other co-located users that are participating in the application. In some aspects, application initialization procedures can also include obtaining permission from the users to share pose and skeletal position information with the HMDs of other co-located users of the application. Further initialization procedures can include a mapping engine 546 initializing map data 448 with current estimates of the positions of participating co-located users.

A pose tracker 526 of console 106 can determine pose and body position information for co-located users (704). In some aspects, the console 106 may receive image data from each of the HMDs 112 of the co-located users and use the image data along with other data received from the HMDs 112 (if any) to determine poses and body position information for the co-located users that appear in the image data and other sensor data. In some aspects, the body positions of the users appearing in the image data can be determined by passing the image data through a machine learning model that has been trained to recognize various body positions such as skeletal points (e.g., joints such as elbows, wrists, shoulders, knees, hips etc.) and/or body segments (e.g., head, neck, torso, arm, forearm, hand, thigh, leg, foot etc.). The body position information may be associated with confidence values for each joint, body segment or other position that indicates the machine learning model's confidence in the position estimates. Other methods of body position recognition are possible and within the scope of the disclosure. In some aspects, the body position information is determined by pose tracker 526 without the aid of markers or other devices placed on the joints or other body parts used by conventional systems to identify body positions.

In some aspects, some or all of the HMDs 112 of the co-located users may determine their own pose and body position information. In such aspects, the console may receive the pose and body position information from the respective HMDs 112 and may not receive image data from some or all of the co-located HMDs 112. The pose and body position information may be 2D or 3D information.

The console 106 can determine the co-located users' positions in a joint mapping space (706). For example, a mapping engine 546 may use image data, pose data and/or other sensor data received from HMDs 112 to determine relative positions of the co-located users. The console 106 can then calibrate the user's position in the shared map with respect to the position of other co-located users.

A pose integrator 542 on console 106 can integrate the pose and body position information determined based on the image data, pose information, body positioning information and/or sensor data from the co-located users' HMDs 112 to determine solved pose and body position information for the co-located users (708). The integration of the pose and body position information can be performed as discussed above with respect to FIG. 6. For example, in some aspects, the confidence level of the pose and body position information can be used to determine the solved pose and body position information. In some aspects, the body position information with the highest confidence level can be used as the solved body position information. In some aspects, the body position information received from co-located users' HMDs 112 can be combined using the confidence level to weight the information from the respective HMD 112 used to determine the solved body position information.

A rendering engine 522 on console 106 can render AR content based on the solved pose and body position information (710). For example, the rendering engine 522 can map avatar characteristics onto the solved body position information for the associated user so that the user's avatar is posed in the same position as determined by the solved body position information associated with the user. The avatar characteristics can include clothing, body shape, skin tone and other characteristics.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:
1. A method comprising:
obtaining, from an image capture device of a first head mounted display (HMD), first image data representative of a physical environment;
determining, by processing circuitry of the first HMD, a first HMD pose representing a position and orientation of the first HMD;
determining, by the processing circuitry of the first HMD from the first image data, first body position information of the users of one or more second HMDs within the physical environment;
transmitting, by the first HMD, the first HMD pose and the first body position information for use by the one or more second HMDs;
receiving, by the first HMD from each second HMD of the one or more second HMDs, a second HMD pose of the respective second HMD and second body position information determined by the second HMD from second image data obtained by the second HMD, wherein the second body position information includes body position information for a user of the first HMD;

integrating, by the processing circuitry of the first HMD, the first body position information with the second body position information to create first solved body position information of the user of the first HMD; and
rendering, by the processing circuitry of the first HMD for display at the first HMD, artificial reality content in accordance with the first pose and the first solved body position information.

2. The method of claim 1, further comprising:
transmitting, by the first HMD, the first solved body position information for use by the one or more second HMDs; and
receiving, by the first HMD, second solved body position information for users of the one or more second HMDs;
wherein rendering the artificial reality content comprises rendering the artificial reality content in accordance with the second solved body position information.

3. The method of claim 1, further comprising:
receiving confidence levels for the first body position information and the second body position information;
wherein integrating the first body position information and the second body position information comprises integrating the first body position information and the second body position information in accordance with the confidence levels.

4. The method of claim 3, wherein integrating the first body position information and the second body position information in accordance with the confidence levels comprises integrating the first body position information and the second body position information in accordance with weights assigned to the first body position information and the second body position information based, at least in part, on the confidence levels.

5. The method of claim 1, further comprising filtering out from the second body position information, body position information received by the first HMD from a second HMD of the one or more second HMDs that is more than a threshold distance from the first HMD.

6. The method of claim 1, further comprising filtering p from the second body position information, body position information received by the first HMD from a second HMD of the one or more second HMDs that is not one of n closest second HMDs to the first HMD, where n is a predetermined or configurable number.

7. The method of claim 1, further comprising:
wherein determining the first body position information of the users of the one or more second HMDs comprises passing the first image data through a machine learning model trained to recognize body positions.

8. The method of claim 1, wherein determining the first body position information of the users of the one or more second HMDs comprises determining, from the first image data, the first body position information of the users without markers disposed on the users.

9. An artificial reality system comprising:
an image capture device comprising circuitry configured to capture first image data representative of a physical environment;
a first head mounted display (HMD) comprising processing circuitry configured to output artificial reality content;
a pose tracker comprising processing circuitry configured to:
determine a first HMD pose representing a position and orientation of the first HMD, determine, from the first image data, first body position information of the users of one or more second HMDs within the physical environment, transmit the first HMD pose and the first body position information for use by the one or more second HMDs, receive, from each second HMD of the one or more second HMDs, a second HMD pose of the respective second HMD and second body position information determined by the second HMD from second image data obtained by the second HMD, wherein the second body position information includes body position information for a user of the first HMD, and integrate the first body position information with the second body position information to create first solved body position information of the user of the first HMD; and a rendering engine comprising processing circuitry configured to render, for display at the first HMD, artificial reality content in accordance with the first HMD pose and the first solved body position information.

10. The artificial reality system of claim 9, wherein the pose tracker is further configured to:

transmit the first solved body position information for use by the one or more second HMDs; and receive second solved body position information for the users of the one or more second HMDs, wherein the rendering engine is further configured to render, for display at the first HMD, the artificial reality content in accordance with the second solved body position information.

11. The artificial reality system of claim 9, wherein the pose tracker is further configured to receive confidence levels for the first body position information and the second body position information, and wherein the pose tracker integrates the first body position information and the second body position information in accordance with the confidence levels.

12. The artificial reality system of claim 9, wherein the first HMD and the one or more second HMDs are co-located HMDs within the physical environment participating in an artificial reality application.

13. The artificial reality system of claim 12, wherein the artificial reality application executes on each of the co-located HMDs.

14. The artificial reality system of claim 9, wherein the image capture device is integrated with the first HMD.

15. A non-transitory computer-readable medium comprising instructions that, when executed, cause one or more processors of an artificial reality system to:

obtain, from an image capture device of a first head mounted display (HMD), first image data representative of a physical environment;

determine a first HMD pose representing a position and orientation of the first HMD;

determining, from the first image data, first body position information of the users of one or more second HMDs;

transmit, by the first HMD, the first HMD pose and the first body position information for use by the one or more second HMDs;

receive, by the first HMD from each second HMD of the one or more second HMDs, a second HMD pose and second body position information determined by the second HMD from second image data obtained by the second HMD, wherein the second body position information includes body position information for a user of the first HMD;

integrate, by the first HMD, the first body position information with the second body position information to create first solved body position information of the user of the first HMD; and render, for display at the first HMD, artificial reality content in accordance with the first pose and the first solved body position information.

16. The non-transitory computer-readable medium of claim 15, wherein the instructions further comprise instructions to:

transmit, by the first HMD, the first solved body position information for use by the one or more second HMDs; and receive, by the first HMD, second solved body position information for the one or more second HMDs;

wherein the instructions to render the artificial reality content comprise instructions to render the artificial reality content in accordance with the second solved body position information.

17. The non-transitory computer-readable medium of claim 15, wherein the instructions further comprise instructions to:

receive confidence levels for the first body position information and the second body position information;

wherein the instructions to integrate the first body position information and the second body position information comprise instructions to integrate the first body position information and the second body position information in accordance with the confidence levels.

* * * * *